Oct. 23, 1928.
B. D. JERABEK
WHEEL REMOVER
Filed March 29, 1926
1,688,716
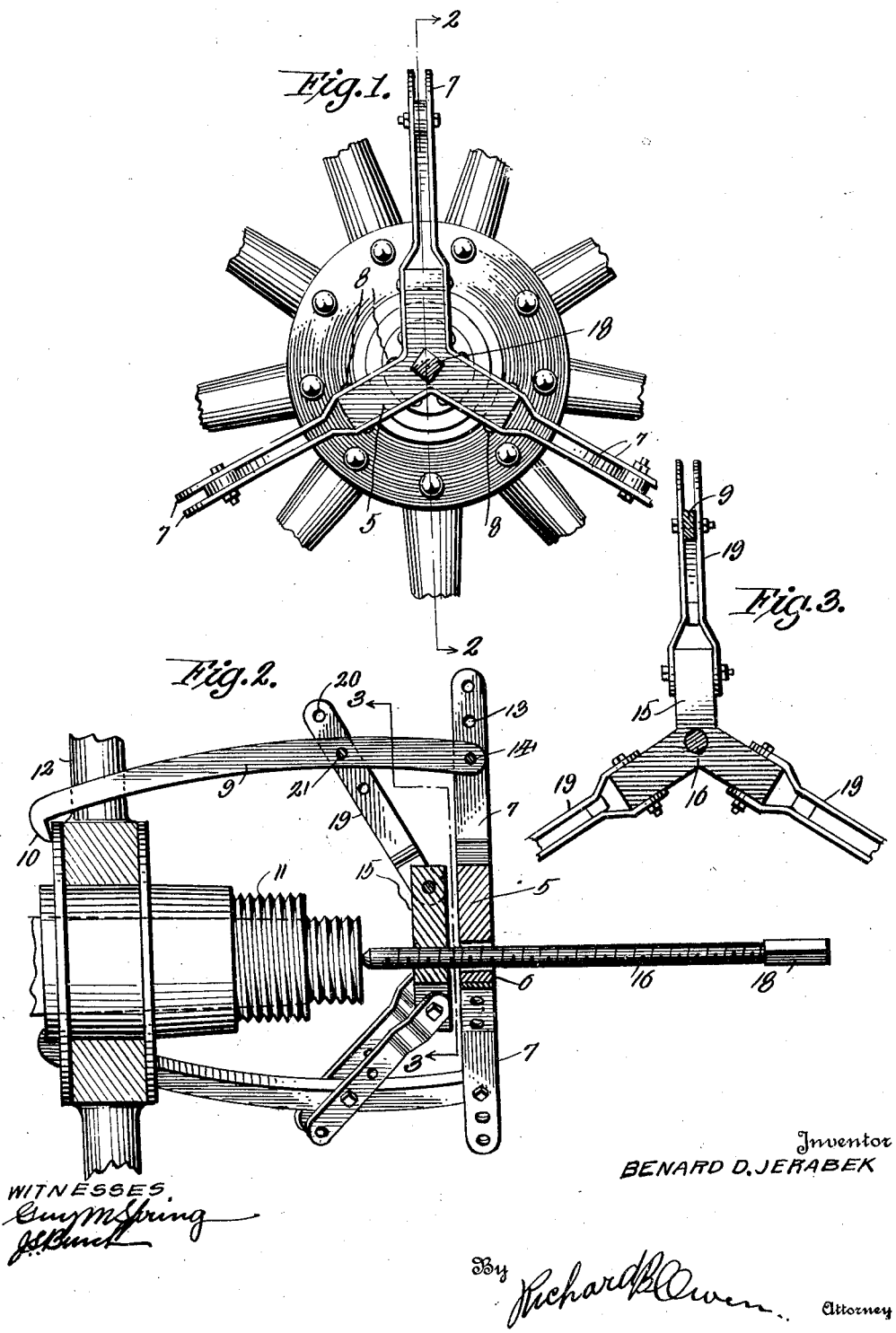
Inventor
BENARD D. JERABEK Patented Oct. 23, 1928.

1,688,716

UNITED STATES PATENT OFFICE.

BENARD D. JERABEK, OF HUTCHINSON, MINNESOTA.

WHEEL REMOVER.

Application filed March 29, 1926. Serial No. 98,332.

This invention relates to wheel removers, and has more particular reference to an improved device for facilitating removal of vehicle wheels, gears and the like from shafts or axles.

The primary object of the present invention is to provide a device of the above kind which is extremely simple and durable in construction as well as efficient in operation.

A further object is to provide a device of the above kind embodying wheel-engaging hooked arms adapted to engage the wheel to be removed, an axial thrust screw engageable with the shaft or axle and adapted to be rotated for exerting an outward pull upon the arms in effecting removal of the wheel, and means to automatically draw the arms toward each other into effective engagement with the wheel as the latter is removed by turning of the thrust screw.

A still further object is to provide a wheel remover of the above kind which may be readily adjusted to suit the requirements of different sizes of wheels, and wherein provision is made for effectively preventing disengagement of the hooked arms from the wheel when the device is being employed for removing the wheel.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the same, Figure 1 is an outer end elevational view of a wheel removing device constructed in accordance with the present invention and operatively engaged with a wheel preparatory to removing the same from an axle, a fragment of the wheel being shown;

Figure 2 is a sectional view taken substantially upon line 2—2 of Figure 1; and

Figure 3 is a section taken upon line 3—3 of Figure 2.

Referring more in detail to the drawing, the present invention embodies a member 5 in the form of a spider having a plurality, and preferably three, radial equally spaced arms and formed with a relatively large central or axial opening as at 6. Each arm of the spider member 5 is provided with an extension composed of a pair of spaced parallel strip members 7 rigidly secured at their inner ends to opposite sides of the associated arm of the member 5 as at 8, by riveting or the like. The strip members 7 are preferably formed of comparatively stiff strap iron, and each strip member 7 of each spider arm is integrally connected at its inner end with the adjacent inner end of the adjacent strip member 7 of the next adjacent spider arm extension whereby the extensions for the three spider arms are formed from three pieces of strap iron and the structure made more durable.

An arm 9 is hinged or pivoted at one end between the strip members 7 of each spider arm extension, and the inner free ends of the arms 9 are provided with inwardly facing hooks 10 adapted to engage behind the marginal portion of a gear, or behind the similar portion of a vehicle wheel hub when the latter is to be pulled or removed from an axle 11 or the like carrying the same. The device is illustrated as employed for removing a vehicle wheel from an axle, and with the wheel engaging arms 9 passing between the spokes 12 of such wheel. However, it is obvious that the hooked arms 9 may be engaged behind the marginal portion of a gear wheel, sprocket wheel or the like for removing the same from a shaft, and that the invention is accordingly not limited to use for removing vehicle wheels from axles.

The strip members 7 of each spider arm extension are provided with a longitudinal series of transverse openings 13 arranged in transversely aligned pairs and adapted for selective removable reception of a transverse pivot pin 14 which is also adapted to pass through a transverse opening in the outer end of the associated wheel engaging arm 9 whereby the latter may be pivotally attached at different distances from the center of the spider member 5 for varying the distance at which the pivoted ends of the arms 9 are positioned relative to each other, whereby the device may be employed upon wheels of different sizes. The outer ends of the arms 9 are positioned between the strips 7 of the spider arm extensions and upon the intermediate portions of the pivot pins 14 so that a durable mounting of the arms 9 is provided.

Disposed inwardly of the spider member 5 is a nut member 15 having a central or axial threaded opening in which is adjustably threaded an axial thrust screw 16. The thrust screw 16 has a pointed inner end as at 17 adapted to bear against the outer end of the shaft or axle 11 carrying the wheel to be removed, whereby the screw 16 may be accurately engaged centrally of the end of the axle and be permitted to freely turn while engaged with such axle or shaft. Suitable means is provided for facilitating manual turning of the thrust screw 16, such as a squared outer end portion 18 adapted for engagement by a wrench or other suitable tool. The nut member 15 has a plurality of radial arms corresponding in number to the number of arms provided for the spider member 5, and the arms of the nut member 15 register with the arms of the spider 5 and have their outer ends connected to the wheel engaging arms 9 by means of links 19. In this way, each arm of the nut member 5 is connected to one wheel engaging arm 9 so that upon threading the thrust screw 16, inwardly through the nut member 15 while engaged with the axle or shaft 11, an outward force is applied upon the nut member 15 for pulling inwardly upon the links 19 and thereby drawing the arms 9 together for maintaining their hooked free ends 10 effectively in engagement with the wheel being pulled or removed from the shaft or axle. This action is permitted by reason of the fact that the thrust screw 16 passes freely through the central opening 6 of the spider member 5.

The links 19 preferably consist of pairs of strips pivoted at their inner ends against opposite sides of the arms of the nut member 15 and at their outer end portions against opposite sides of the intermediate portions of the wheel engaging arms 9, the strips forming the links 19 being provided at their outer ends with a longitudinal series of openings 20 aligned in transverse pairs whereby the point of pivotal connection of each arm 9 with the associated links 19 may be varied. A removable pivot pin 21 passes through each arm 9 and the associated links 19 for effecting connection of these parts, such pivot pin 21 being adapted for selective reception in any desired pair of the openings 20 of the links 19. It is apparent that a very wide range of adjustment of the arms 9 may be obtained through the adjustable connection of said arms 9 with both the links 19 and the arm extensions of the spider 5.

When employing the present device the thrust screw 16 is threaded outwardly of the nut member 15 and the spider member 5 is moved outwardly on the thrust screw 16 away from the nut member 15 so that the arms 9 are separated sufficiently to permit the wheel or wheel hub to pass therebetween. The spider member 5 is then moved toward the nut member 15 so as to cause the arms 9 to swing toward each other until their hooked free ends 10 engage behind the wheel or wheel hub as shown in Figure 2. The thrust screw 16 is then threaded inwardly against the end of the axle or shaft 11 so that an outward displacement of all parts of the device except the screw 16 is had and a corresponding movement of the wheel effected for removing the same from the shaft or axle carrying the same. When this outward movement is had an outward pressure is exerted on the nut member 15 so as to apply a pull upon the links 19 and thereby effectively draw the arms 9 into engagement with the wheel or wheel hub so that accidental disengagement of the device from the wheel is effectively prevented.

From the foregoing description it is believed that the construction and operation as well as the advantages of the present invention will be readily understood and appreciated by those skilled in the art.

What I claim as new is:—

In a wheel remover, a spider member provided with arms, a strap arm projecting beyond the end and from each side face of each arm of said member, those strap arms arranged against the adjacent faces of the spider arms being integrally connected at their inner ends, hooked wheel engaging arms each having its outer end pivoted between a pair of strap arms carried by a spider arm, a nut member disposed inwardly of the spider member, links pivotally connecting the intermediate portions of the arms with the nut member, and an axial thrust screw passing freely through the spider member and threaded through the nut member, said wheel engaging arms being of arcuate form and arranged to present the convexed sides outwardly of the longitudinal center of the device.

In testimony whereof I affix my signature.

BENARD D. JERABEK.